Aug. 26, 1969

L. B. FURRY ET AL 3,462,910

COUNTING AND FEEDING APPARATUS

Filed July 18, 1966

LYMAN B FURRY
CHARLES W KAGY
*INVENTOR.*

BY

*THEIR ATTORNEY*

Aug. 26, 1969    L. B. FURRY ET AL    3,462,910
COUNTING AND FEEDING APPARATUS
Filed July 18, 1966    4 Sheets-Sheet 2
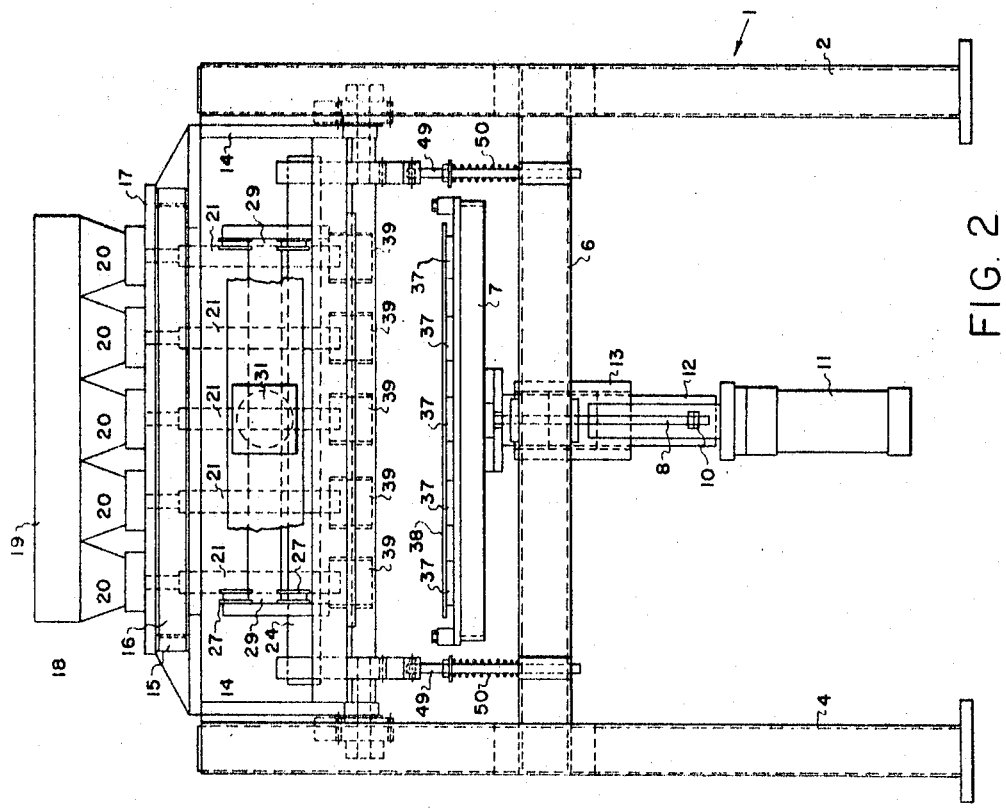
LYMAN B FURRY
CHARLES W KAGY
*INVENTOR.*
BY
THEIR ATTORNEY Aug. 26, 1969    L. B. FURRY ET AL    3,462,910
COUNTING AND FEEDING APPARATUS
Filed July 18, 1966    4 Sheets-Sheet 3
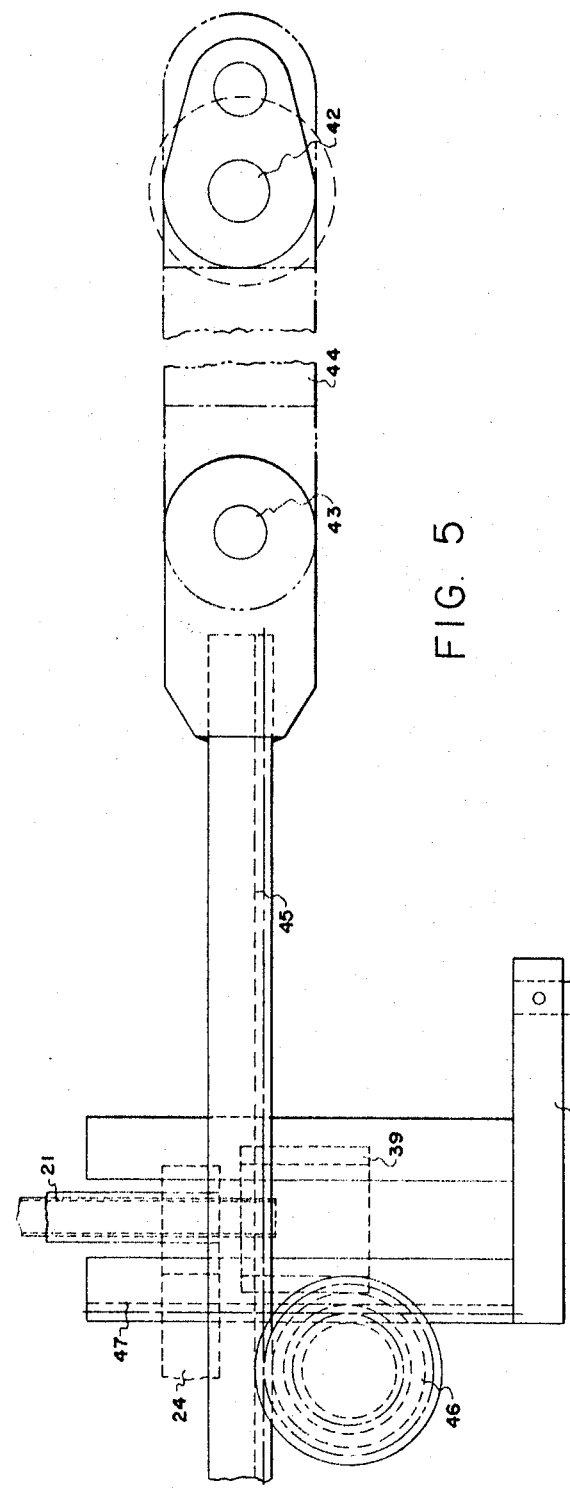
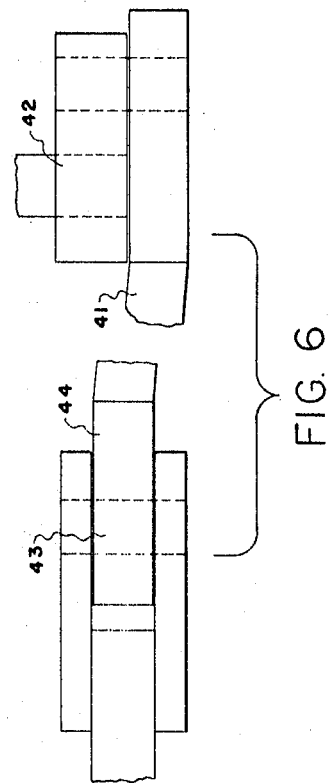
LYMAN B FURRY
CHARLES W KAGY
*INVENTOR.*
BY *Merl J Mosely*
THEIR ATTORNEY Aug. 26, 1969  L. B. FURRY ET AL  3,462,910
COUNTING AND FEEDING APPARATUS
Filed July 18, 1966  4 Sheets-Sheet 4
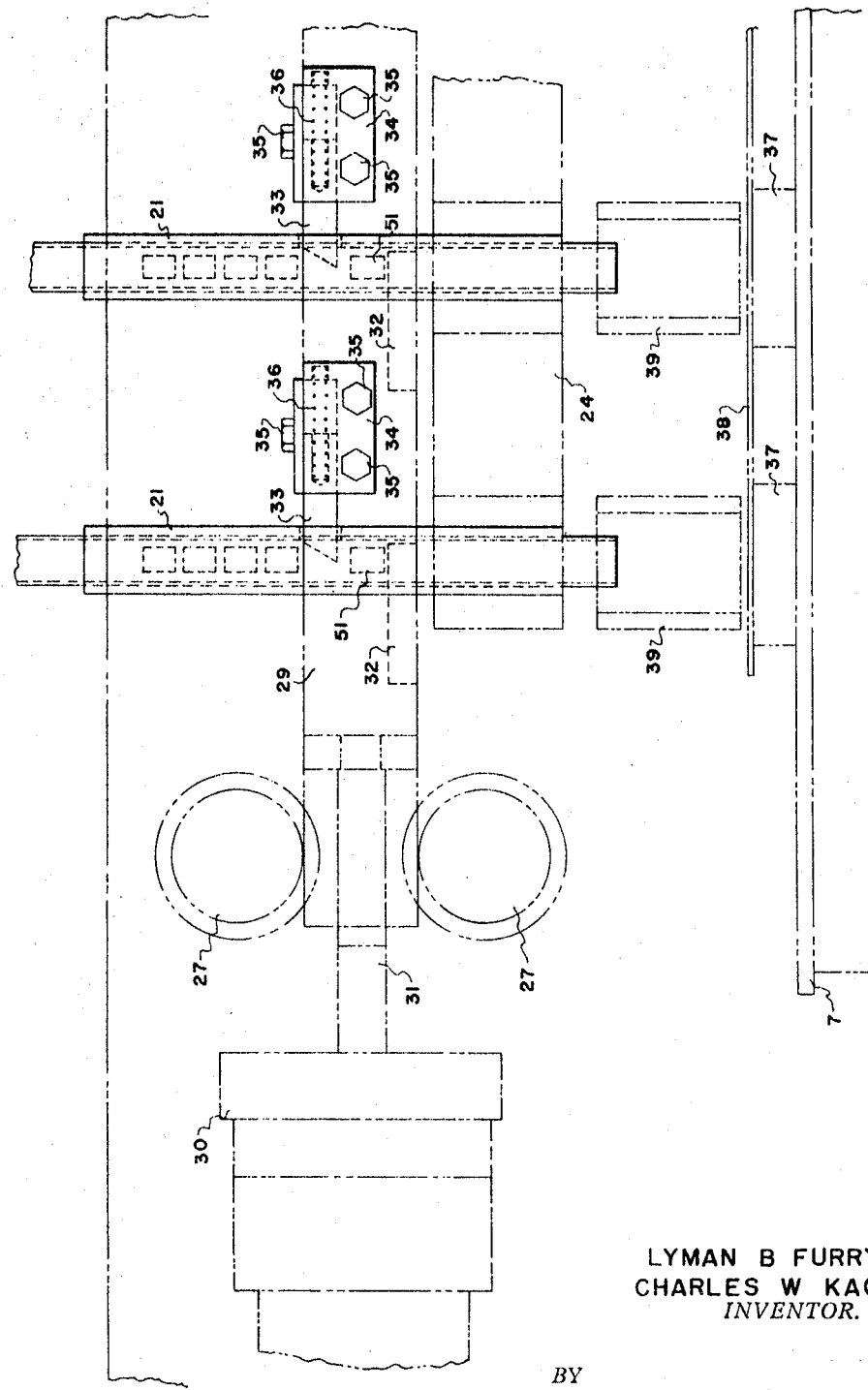
LYMAN B FURRY
CHARLES W KAGY
*INVENTOR.*
BY
THEIR ATTORNEY United States Patent Office 3,462,910
Patented Aug. 26, 1969

3,462,910
COUNTING AND FEEDING APPARATUS
Lyman B. Furry, 15 N. Alexander, and Charles W. Kagy, 900 James St., both of Danville, Ill. 61832
Filed July 18, 1966, Ser. No. 566,024
Int. Cl. B65b 57/20, 39/12, 11/50
U.S. Cl. 53—78                          10 Claims

ABSTRACT OF THE DISCLOSURE

This invention comprises a new and improved apparatus for feeding and counting a plurality of articles to a plurality of containers or receptacles for subsequent handling, packaging, or processing. The apparatus includes a supply reservoir having a plurality of supply hoppers aligned with the containers or receptacles being fed. Vertically movable supply tubes are reciprocated into each of the hoppers to feed parts therethrough. The tubes are provided with vanes to stir up the parts in the hoppers to insure an uninterrupted flow of parts. A system of laterally movable, pneumatically or hydraulically actuated bars are provided with abutments extending into the supply tubes engaging the parts therein and operable upon movement to cause the parts to be fed one at a time to the containers or receptacles being filled. In operation the containers being filled (usually a card of blister packages) are placed on a movable table which is elevated to position the containers under the respective supply tubes. The supply tubes are reciprocated a predetermined number of times and the feed bar actuated to allow one of the parts to drop into each receptacle. After a predetermined number of cycles the feed mechanism stops and the storage table is lowered for the start of a new cycle.

BACKGROUND OF THE INVENTION

Figure 1:
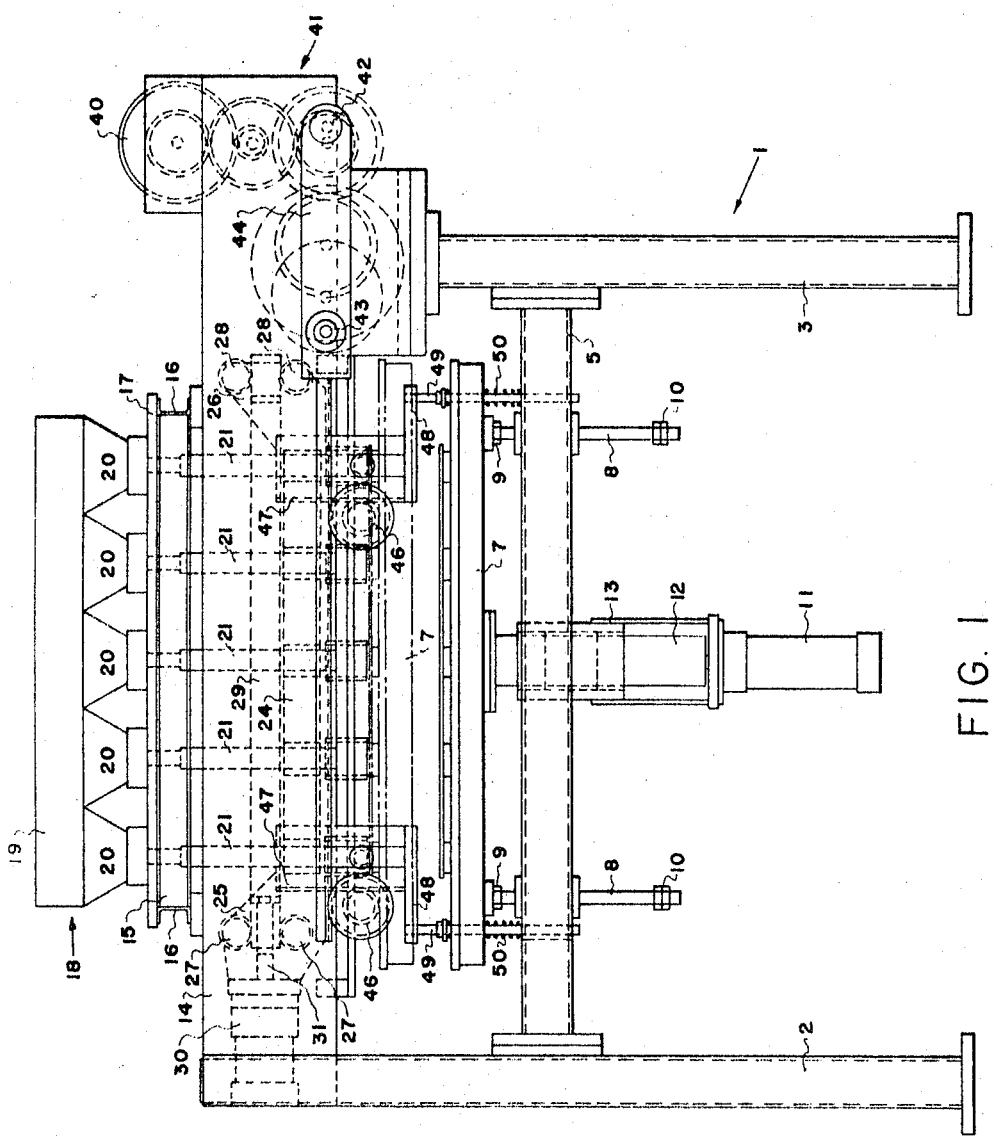

In the packaging of small parts, e.g., screws, bolts, small mechanical fittings, etc., a form of convenient packaging which has recently come into prominent use is the packaging of such parts in so-called blister packages. In blister packaging there is usually provided a large cardboard sheet having a plurality of holes regularly spaced therein with plastic bubbles or blisters extending from the holes to provide a receptacle for storage and packaging of the desired product. In blister packaging, it is necessary to feed and count a predetermined number of parts simultaneously into each of a plurality of blisters positioned uniformly on a large sheet. After the parts are counted and fed into each of the plurality of blisters, a backing sheet of cardboard or of another clear plastic material is cemented to the sheet to produce a large composite package sheet having a predetermined number of sealed blister packets which may be cut apart and marketed or otherwise handled as separate package units.

In the art of blister packaging, one of the main problems has been the difficulty of simultaneously counting and feeding a predetermined number of parts to a plurality of different blister receptacles on a large blister package sheet. Counting and feeding equipment which has been previously available commercially has been inadequate to count and feed a predetermined number of parts separately to a plurality of blister receptacles with complete reliability.

Much of the prior art on counting and feeding mechanisms is concerned with apparatus for feeding a plurality of individual articles successively to a single receptacle or container. U.S. Patents 1,085,125, 2,078,694, 2,203,287, 2,384,052, 2,500,698, 2,540,604, 2,618,421, and 2,785,682 are concerned with the feeding of individual articles from a hopper or reservoir to a single receptacle or container or other processing point. U.S. Patents 1,834,641 and 3,124,269 are concerned with mechanisms for controlling the delivery of individual articles in a feed mechanism and in particular with the freeing of articles which are stuck or jammed in a position which will not permit free flow through the apparatus. U.S. Patents 3,032,211 and 3,164,241 are typical patents concerned with the delivery of a plurality of articles to a number of different supply points.

The prior art, as exemplified by the above-mentioned patents, has not provided a satisfactory solution to the problem of counting and feeding a plurality of objects to a plurality of different supply points in a smooth and uniform manner. The prior art has not provided the basis for the design of a counting and feeding mechanism wherein a number of articles can be fed from a single supply hopper or reservoir through a plurality of different supply channels to a plurality of receptacles or containers, wherein there is provided means for insuring that the predetermined desired number of articles are supplied to each supply container and means is provided for insuring the free and steady flow of the articles being fed and counted.

DESCRIPTION OF THE INVENTION

This invention relates to packaging apparatus and is more particularly concerned with the feeding and counting of a plurality of articles to a plurality of containers or receptatcles for subsequent packaging or processing. The aparatus is designed to count and feed a plurality of objects to a number of different receptacles or storage points.

The apparatus is shown more fully in the drawings wherein:

FIG. 1 is a view in side elevation of the feeding and counting apparatus comprising this invention, FIG. 2 is a view in end elevation of the apparatus shown in FIG. 1, FIG. 3 is a detail view showing one of the counting and feeding tubes at the point of insertion into the product supply hopper, FIG. 4 is a detail end view of the counting and feeding tube shown in FIG. 3, FIG. 5 is a detail view of the portion of the apparatus used to reciprocate the counting and feeding tubes, FIG. 6 is a detail plan view of the drive linkage for the apparatus shown in FIG. 5, and FIG. 7 is a detail view of the apparatus for counting and feeding articles through the supply tubes.

Referring to the drawings by numerals of reference and more particularly to the assemblies shown in FIGS. 1 and 2, there is shown a counting and feeding apparatus 1 which comprises a frame having vertically extending legs 2 and 3 at the front and vertically extending legs 4 (only one of which is shown in FIG. 2) at the rear. The supporting frame includes laterally extending support beams 5 and 6 shown in FIGS. 1 and 2 respectively.

On beams 5 and 6 there is supported a movable work support table 7 which is provided with guide rods 8 fitted into table 7 as indicated at 9 and having adjustment nuts 10 at their lower extremities limiting movement of table 7 in upward direction.

The vertical movement of table 7 in the apparatus is controlled and actuated by a fluid-operated cylinder 11 having an actuating piston 12 and supporting framework 13 supported by beams 5 and 6. Cylinder 11 is pneumatically operated but may be hydraulically operated, if desired. Pneumatic cylinder 11 operates piston 12 to actuate table 7 for movement upward into position beneath the counting and feeding tubes of the apparatus.

At the upper end of the supporting frame there are provided longitudinally extending support members 14 on which there are mounted support members 15 and 16 for plate 17 supporting the hopper structure 18. Hopper structure 18 comprises a single supply hopper 19 having a plurality of feed hoppers 20 extending downwardly therefrom. In the apparatus shown in FIGS. 1 and 2, there are 25 of the feed hoppers 20 positioned beneath the single supply 19 and arranged for supply of the parts which are to be counted and fed to 25 separate storage or packaging receptacles.

Each of feed hoppers 20 is provided with a feeding and counting tube 21 which extends into the bottom of the hopper to receive the parts or articles which are to be counted and fed to the separate storage or packaging reservoirs. The upper end of counting tubes 21 is shown in an enlarged detail view (in relation to the other figures) in FIGS. 3 and 4 to illustrate the relationship of tube 21 to supply hopper 20. The upper end of each of counting and feeding tubes 21 fits through the bottom of supply hopper 20 in the sleeve portion 22 at the bottom of the hopper. Each of tubes 21 is provided with outwardly extending vanes 23 which extend longitudinally of tubes 21 and extend through slots in the bottom of hoppers 20. Vanes 23 function to guide the movement of tubes 21 but more particularly function to engage the parts or articles in hopper 20 to agitate said articles to insure that the articles are fed evenly into the end of tube 21.

In operation, tube 21 is reciprocated in a vertical direction so that vanes 23 stir up or agitate the articles which are to be fed and insure that the articles enter the end of tube 21. Without the vanes 23, vertical reciprocation of tube 21 would tend to feed articles into the end of the tube but frequently two or more of the articles would bridge across the end of the tube and jam at that point, thus preventing the steady and uniform feeding of articles through the tube. The presence of vanes 23 on the vertically movable tube 21 causes the articles in hopper 20 to be repeatedly agitated and thus prevents the articles from jamming at the entrance to tube 21. The apparatus for effecting vertical reciprocation of tubes 21 will be described more fully hereinafter and is operable to reciprocate each of the tubes into its respective supply hopper a predetermined number of times for each time that the feed mechanism at the lower portion of the tube is actuated.

Supply tubes 21 are supported in support plate 24 as indicated in FIGS. 1 and 2. Support plate 24 is arranged for vertical reciprocal movement in a manner which will be subsequently described. Support plate 24 has mounted thereon vertically extending plates 25 and 26 at opposite ends thereof, plates 25 and 26 support guide rollers 27 and 28 for a laterally or horizontally movable bar 29. Support plate 25 also supports a fluid operated cylinder 30 for piston 31 which operates bar 29. Cylinder 30 may be pneumatically or hydraulically actuated but is preferably pneumatically actuated using the same compressed air source as cylinder 11. Cylinder 30 is operable to move bar 29 reciprocally in a direction longitudinally of the apparatus as viewed in FIG. 1.

The operation of bar 29 is arranged to control the feed of articles through tubes 21 and is shown in more detail in FIG. 7. Bar 29 is provided with a plurality of fixed abutments 32 which extend through apertures in the walls of tubes 21 to a position obstructing the flow of the articles being fed through tubes 21. Bar 29 is also provided with a plurality of spring loaded abutment stop members 33 which extend through apertures in the wall of tubes 29 in the opposite direction from abutment members 32. Spring loaded abutment members 33 are supported in brackets 34 secured in place by screws 35 and are provided with springs 36 urging abutment members 33 to the left as viewed in FIG. 7. The apparatus is provided with a plurality of the bar members 29 with stop members 32 and 33 arranged to control the flow of articles through each of the several tubes 21. When cylinder 30 moves bar members 29 to the left the abutment members 32 are moved out of position beneath the articles being fed through tube 21 to allow it to fall into receptacle 37 as indicated in FIG. 7.

Movement of abutment members 32 to the left simultaneously moves abutment members 33 into engagement with the next lowermost of the articles being fed through tubes 21 to hold the same in position while the lower portion of the tube is open. Next, movement of bar members 29 to the right moves abutment members 32 back into position blocking flow through tube 21 and moving members 33 out of position to allow the next of the articles being fed to come to position resting on abutment members 32. This alternate movement to the left and to the right by bar members 29 is operable to feed articles successively, one at a time, through tubes 21 to receptacles 37 positioned immediately below the lowermost ends of tubes 21. Receptacles 37 are preferably blisters of plastic material on a storage card 38. After a predetermined number of articles have been supplied to storage blisters 37 the apparatus is stopped and a cover sheet of plastic or cardboard or other sheet material is cemented over or otherwise secured to sheet 38 to provide a plurality of separate and distinct packages on a single sheet.

During the feeding of articles tthrough tubes 21 to packages 37 the articles being fed are restrained from bouncing out of their respective receptacles by guide sleeves 39 which are interposed between the lower ends of tubes 21 and receptacles 37. In other views of the apparatus it will be noted that receptacles 37 on supporting card or sheet 38 are moved into and out of position while supported on table 7. Guide sleeves 39 which prevent bouncing of articles being fed, are supported in a fixed position in the apparatus. The guide tubes 21, actuating cylinder 30 and actuating bars 29 and support rollers 27 and 28 are all supported on plate member 34 and are reciprocally movable in a vertical direction as will be subsequently described.

In the upper right portion of FIG. 1 there is shown a motor 40 and gear train 41 comprising a plurality of gears which are not individually numbered. Gear train 41 is connected as indicated at 42 and 43 to drive rod 44 which in turn is connected to rack member 45. Rack member 45 operates pinion gear 46 which in turn engages and operates vertically extending rack 47. The apparatus is provided with two sets of rack and pinion gears positioned at opposite ends of the apparatus as shown in FIG. 1. The rack and pinion arrangement is shown in more detail in FIGS. 5 and 6 of the drawing.

Vertically extending rack 47 is part of a unitary frame structure which includes supporting plate 24 supporting tubes 21 and has plates 48 secured at its lower extremity which are provided with downwardly extending guide rods 49 operating against springs 50. The movement of horizontally extending rack 45 back and forth by motor 40 and gear train 41 causes pinion gears 46 to be rotated and to move vertically extending racks and the associated framework up and down in the apparatus. This causes tubes 21 to be reciprocated vertically together and thus move up and down into the bottom of supply hoppers 20 to cause the articles or parts being fed therefrom to enter the upper ends of tubes 21 at a uniform rate and to keep tubes 21 filled with the parts being fed.

OPERATION

The operation of this apparatus is designed to feed a number of mechanical parts or other objects from a supply reservoir to a plurality of different supply points. In a preferred form of this invention the apparatus was designed to feed a plurality of small mechanical parts, viz, Zerk fittings, from a supply reservoir to a plurality of receptacles in a supply card. The supply or storage card 38 was formed of cardboard and provided with a plurality of openings having plastic bubbles or blisters 37 extending outwardly from the openings. The card was designed to provide receptacles for 25 different sets of fittings (the apparatus could easily be modified to accommodate more or less supply points). When the blisters 37 are filled with a predetermined number of the fittings or parts to be stored therein the card is removed from the apparatus and provided with a flat cover card of carboard or plastic or other sheet material which is cemented or otherwise fastened to supporting card 38. The resulting package comprising a plurality of sealed blisters may be used as a single package having a plurality of separate compartments or may be cut up into a plurality of separate packages for storage handling, or marketing.

In using the apparatus of this invention for counting and feeding a plurality of parts to a storage card having a plurality of separate storage receptacles, the storage card 38 is placed on vertically movable table 7 when in the downwardly extended position as shown in FIGS. 1 and 2. The fluid actuated cylinder 11 is then actuated to move table 7 upward to a position just below sleeves 39 as indicated by the dotted position in FIG. 1. When table 7 is moved to this position the storage card 38 is positioned with each of the storage reservoirs or blisters 37 positioned directly beneath each of the respective sleeves 39. With the table 7 in this position, motor 40 is actuated to move the rack mechanism shown in FIGS. 1, 5, and 6 of the drawing. Movement of rack 45, as previously described, causes vertically extending racks 47 to move up and down and to move tubes 21 up and down into the individual supply reservoirs 20. The apparatus is designed so that for each time that a part or other article being fed is dropped into the blisters on storage card 38, the tubes 21 will be moved up and down into the bottom of supply reservoirs 20 a predetermined number of times. Thus, by appropriate selection of the gear ratios in the gear train 41 the tubes 21 can be reciprocated five or ten or twenty times, more or less, into the bottom of supply reservoirs 20. The movement of tubes 21 up and down into supply reservoirs 20 causes the parts or articles being fed to be shaken so that at least one of said parts or articles will fall into the open upper end of the tube. The outwardly extending flanges 23 on tubes 21 assist in stirring or shaking the parts in the supply hoppers 20 so that two or more of the parts will not jam the entrance to tube 21.

After tubes 21 have been moved said predetermined number of times, gear train 41 actuates a control switch (not shown) which causes fluid actuated cylinder 30 to move rod 29. Rod 29 is first moved to the left to drop one of the parts 51 in tube 21 into blister packet 37. Movement of rod 29 to the left causes abutment 32 to move out from under part 51 and allow said part to fall into blister packet 37. As previously described, sleeve 39 prevents the part which is dropped from bouncing out of the receptacle into which it falls. When rod 29 is moved to the left and abutment 32 is moved to stop part 51, abutment member 33 is simultaneously moved to the left to engage the part 51 which is positioned next above the one which is being dropped into storage packet 37. As was noted in the description of the apparatus, abutment 33 is movable within its supporting bracket and is spring loaded. This arrangement permits abutment 33 to be retracted against the force of spring 36 if it engages one of the parts 51 in a position directly in front of abutment 33.

After fluid motor 30 has moved rod or bar 29 to the left to drop one of the parts 51 into each of the storage packets or reservoirs 37, the motor 30 then moves rod 29 to the right to move abutment members 32 back into position blocking flow of parts 51 through tubes 21. The movement of abutment members 32 back into position is coordinated with the movement of abutment members 33 out of position to allow the parts 51 positioned in the upper part of the tube to fall into position where they are supported on abutment members 32.

The motor 40 and gear train arrangement 41 are designed so that tubes 21 will be reciprocated in a vertical direction a predetermined number of times, e.g., five or ten times, after which fluid motor 30 is actuated to allow one of parts 51 to drop through each of tubes 21 into storage packets 37. The motor 40 and gear train 41 are then actuated further to move rack 45 through another predetermined number of movements to reciprocate supply tubes 21 vertically and cause more of the parts to be supplied from supply hoppers 20.

The control circuit (not shown) for the apparatus and the motor 40 and gear train 41 are designed and coordinated in operation so that at the initiation of the operation of the apparatus, supply card 38 is placed on table 7 and table 7 moved into position as previously described. The tubes 21 are reciprocated vertically a predetermined number of times, e.g., five times, to insure that the parts 51 enter the upper end of tubes 21 properly. As previously noted the flanges or vanes 23 on tubes 21 prevent parts 51 from jamming at the upper open ends of tubes 21. For every predetermined number of times that tubes 21 are moved vertically, the rack mechanism is stopped and fluid cylinder on motor 30 is operated to drop one of parts 51 into each of the supply packets or blisters 37 and to drop the remaining parts in the tubes 21 into position on the feed abutments 32. The tubes are again reciprocated vertically to insure that the parts are entering the upper ends of the tubes properly and the feeding function repeated. The timing mechanism and gear ratios in gear train 41 are selected and adjusted to provide for the apparatus to stop after a predetermined number of parts 51 are fed into supply packets or blisters 37, at the end of the counting and feed cycle, the cylinder 11 is again actuated to retract table 7 to the initial position shown in FIG. 1. At this point, card 38 is withdrawn with supply packets or blisters 37 on the card each filled with the predetermined desired number of parts or fittings.

While this invention has been described fully and completely with emphasis upon a preferred embodiment thereof, it should be understood that within the scope of the appended claims the invention may be practiced otherwise than as specifically described herein.

What is claimed is:

1. An apparatus for counting and feeding small parts to a plurality of receptacles comprising:
    (a) storage means for the parts to be counted and fed,
    (b) movable supporting means to support the receptacles to be filled,
    (c) a plurality of supply tubes mounted for reciprocal movement into said storage means to receive parts therefrom,
    (d) counting means comprising a pair of abutment means having a common support,
    (e) means for moving said common support for simultaneous movement of said abutment means, and
    (f) said counting means being associated with each of said tubes to feed parts one-by-one through the tubes to receptacles on said movable supporting means.

2. An apparatus according to claim 1 in which said storage means comprises a hopper assembly having a plurality of separate feed hoppers, one for each receptacle to be filled, and said supply tubes extend into each of said feed hoppers.

3. An apparatus according to claim 1 in which said supply tubes are provided with outwardly extending vanes to stir the parts in said storage means and insure uninterrupted flow thereto.

4. An apparatus according to claim 1 in which there are provided a plurality of movable bars supporting said pair of abutment members extending into said tubes from opposite sides, said bars being movable in one direction to move one of the abutment members to release a part to be fed from its tube and to move the other abutment member to support the remaining parts in said tube, and movable in another direction to move said first-named abutment member to close the end of said tube and to move the second-named abutment member to permit the remaining parts in the tube to move downward by the space vacated by the ejected part.

5. An apparatus according to claim 4 in which said second-named abutment member is movably supported on its supporting bar and spring-biased in an extended position.

6. An apparatus according to claim 4 which includes means to reciprocate said tubes a predetermined number of times and then move said bars and abutments to feed the next one of said parts through each of said supply tubes.

7. An apparatus according to claim 4 which includes a plurality of sleeves positioned in a fixed position at the lower ends of said tubes and into which said tubes move prior to ejection of parts therefrom, said sleeves preventing the parts from bouncing out of the receptacles on said movable supporting means.

8. An apparatus according to claim 4 in which the means for moving said tubes comprises a horizontally movable rack which operates a plurality of pinions which in turn, operate vertically movable racks supporting said tubes.

9. An apparatus according to claim 8 in which said rack and pinion members are actuated a predetermined number of times and then said bar members are actuated to move said abutments and feed parts from said tubes.

10. An apparatus according to claim 9 in which said movable supporting means is moved to position storage receptacles at the lower ends of said tubes at the start of operation of the apparatus, said tubes are reciprocated a predetermined number of times and said bar members moved to feed parts from said tubes, said reciprocation of tubes and actuation of bar members being repeated a plurality of times and including means to retract said supporting means and inactivate the apparatus after said plurality of actuations of said bar members.

References Cited

UNITED STATES PATENTS 2,311,251 2/1943 Rees et al. _____ 221—181 X
2,656,962 10/1953 Daniels _____ 221—68

TRAVIS S. McGEHEE, Primary Examiner

U.S. Cl. X.R.

221—68